United States Patent [19]

Witte

[11] 4,122,104

[45] Oct. 24, 1978

[54] PROCESS FOR EXTRACTING OILS FROM OIL CONTAINING RAW MATERIALS

[75] Inventor: Johan Frederik Witte, Amsterdam-Nieuwendam, Netherlands

[73] Assignee: Stork Amsterdam B.V., Netherlands

[21] Appl. No.: 723,559

[22] Filed: Sep. 15, 1976

[30] Foreign Application Priority Data

Sep. 19, 1975 [NL] Netherlands ........................ 7511125

[51] Int. Cl.[2] ................................................ C09F 5/02

[52] U.S. Cl. .............................. 260/412.4; 260/412.2; 426/430

[58] Field of Search .......................... 260/412.4, 412.2; 426/417, 430, 461; 100/116, 117

[56] References Cited

U.S. PATENT DOCUMENTS

| | | | |
|---|---|---|---|
| 734,239 | 7/1903 | Pratt | 260/412.4 |
| 1,446,606 | 2/1923 | Whitehead | 260/412.4 |
| 2,253,696 | 8/1941 | Fauth | 260/412.4 |
| 2,320,970 | 7/1943 | Lansing | 260/412.4 |
| 2,608,565 | 8/1952 | Bonotto | 260/412.4 |

*Primary Examiner*—Patrick Garvin
*Assistant Examiner*—John F. Niebling
*Attorney, Agent, or Firm*—Ostrolenk, Faber, Gerb & Soffen

[57] ABSTRACT

Apparatus for extraction of oils or fats from oil containing seeds by initially reducing the material size by means of crushing rollers, thereafter heating the material, pressing same in a rotopress having a pressing chamber with decreasing cross section in the direction of the outlet and by finally subjecting the material to a solvent extraction.

7 Claims, 1 Drawing Figure

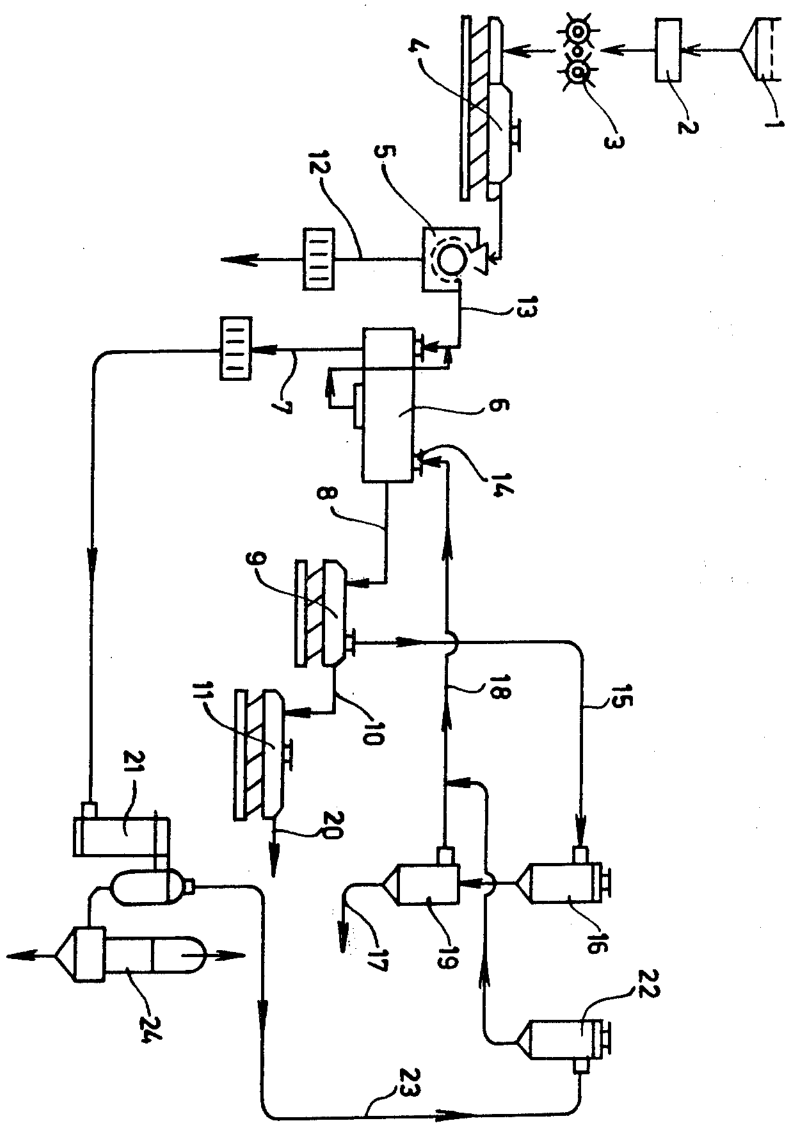
1
2
3
4
5
6
7
8
9
10
11
12
13
14
15
16
17
18
19
20
21
22
23
24

PROCESS FOR EXTRACTING OILS FROM OIL CONTAINING RAW MATERIALS

BACKGROUND OF THE INVENTION

This invention relates to a process for extracting oils and fats from vegetable raw materials by initially reducing the size of these raw materials, conditioning and subjecting the raw materials to an extraction by means of solvents; the recovery proper of oils and fats and solvent from the extract is then completed.

Oil containing seeds with a high fat content are generally extracted in two steps. First, a part of the fat or oil is removed by pressing the material and secondly, a quantity of fat or oil is removed by means of extraction by a solvent. When seeds with a low fat content are to be treated, pressing them has little effect, so that an extraction is then generally only carried out by means of a solvent.

An extraction process was only thought to be effective so far when the size of the raw material to be extracted was reduced. This was done by rolling the raw material until only thin flakes were left. Such a rolling treatment had not only to be carried out with great care and by means of smooth rollers, but it also consumed much energy. Moreover, many irregularities occur during the rolling operation, particularly during the extraction treatment, which can give rise to unsurmountable difficulties.

This process is moreover expensive, as the rollers consume much energy and require much upkeep.

In order to enhance the extractability of the raw material, the same is usually, after the rolling operation, submitted to a thermal treatment up to 100° C. which is maintained for some time. It is sometimes necessary to maintain a high humidity during this heating period, which can be realized by heating with open steam, and by adding water, if required.

After the heating period, the material is dried until the desired extraction humidity is obtained.

The aforementioned heat treatment is mostly carried out in vertical cylindrical vessels which are partially double-walled, so that the material is heated indirectly by means of steam. The vessels are divided into a number of compartments by double-walled partitions. By means of a stirrer and a valve system, the raw material to be treated is passed through them from top to bottom.

The entire residence time of the material in these vertical cylindrical vessels ranges from about three quarters of an hour to 2 hours.

A treatment in these cylindrical vessels is, however, very inconvenient, as the raw material is hampered hereby. Owing to a bad heat transfer, high temperatures of the walls of these cylindrical vessels are required. Moreover, ineffective mixing of the material and an excessive residence in the vessels inevitably cause a part of the raw material to be exposed to excessive heating, so that decomposition products are produced which impair the quality of the oil.

Owing to the high temperatures, moreover, a denaturation of the proteins in the solid material is produced which gives rise to a decrease in value of the extracted meal.

After the thermal treatment in the vertical cylindrical vessels, extraction by means of a solvent takes place, whereby two flows are produced, viz. a flow of solvent mixed with oil, and a second flow of solid material mixed with a solvent.

The flow of solvent mixed with oil is separated into oil and solvent by means of an evaporator and a stripping column; the second flow of solid material mixed with solvent is passed to a cylindrical vessel where the solvent is removed. The remainder of the solid material is finally dried and used as fodder or raw material for the recovery of proteins.

During the latter treatment excessive temperatures are also inevitable, which decreases the value of the proteins owing to denaturation.

SUMMARY OF THE INVENTION

The present invention aims to provide a process for the extraction of oils or fats from vegetable seeds which does not present the aforementioned disadvantages and in which the size of the raw material need not be reduced by preliminarily rolling the same into flakes.

This is attained by a process for extracting oils or fats from vegetable raw materials by initially reducing the size of the raw materials, subjecting the crushed material to a conditioning treatment in the presence of heat, to a pressing treatment and an extraction with subsequent recovery of oils, fats and solvent from the extract, wherein the oil containing seeds are coarsely preliminary broken and subjected to a conditioning treatment, while oil is pressed out in a pressing area, the cross section of which decreases in the direction of the outlet and this pressed product is finally extracted.

This process presents the considerable advantage that rolling the raw material into thin flakes, prior to performing the conditioning treatment, is omitted which saves investments and hence energy- and upkeep expenses.

The product which was first coarsely crushed is very well extractable. The extraction is preferably carried out while using variable pressure extraction.

The invention relates, in another aspect, to an apparatus for carrying out the present method. This apparatus includes at least a device for reducing the size of vegetable material and a conditioning and extracting device. Moreover, separating means are mounted for separating oils or fats and extraction solvent.

The size reducing device is solely constructed of crushing rollers which coarsely crush the initial material, whereafter the crushed material is directly transferred to a conditioning device the outlet of which opens into a rotary press with a pressing chamber. The cross section of this pressing chamber decreases in the direction of the outlet, while an extraction device adjoins the conditioner.

Such an apparatus only consumes little energy and only needs moderate upkeep. Due to the direct conditioning of the coarsely broken product without the aid of further crushing rollers, the expenses to be invested in this machine are very low.

SURVEY OF THE DRAWINGS

In the drawing, a diagrammatic view of an apparatus according to the invention is shown.

DESCRIPTION OF PREFERRED EMBODIMENTS

The drawing shows an apparatus which includes means 1 for cleaning the seed from impurities like wood, stone and metal.

After having passed the cleaning device 1, any fibres in the raw material are removed e.g. in a fibre removing device 2.

The raw material, which can now be considered to be rather clean, is thereupon preliminarily crushed in rollers 3. Presently, a coarsely crushed product is obtained, that is to say a product consisting of seed particles which at least have been crushed once, but mostly two or three times; this depends on the size of the seeds.

The coarsely broken seeds having a size of 1 or 2 mm are subsequently subjected to a thermal treatment in a shaker conditioning device 4 (see e.g. Netherlands patent application No. 73, 12094 and the corresponding U.S. Pat. No. 3,972,278) in order to improve the extractability of the material.

After this treatment, the oil is pressed out by means of a rotary press 5, see British patent specification No. 958,014, while the oil is discharged through an outlet 12.

Apart from the already produced oil, a cake is obtained with an oil content ranging from 15 to 30% of oil, which cake is discharged from the press 5 via a conveyor 13 to an extraction vessel 6. Here an extraction is effected by means of an extractant, for instance hexane, supplied through a feed line 18 and inlet 14.

For the latter extraction by means of hexane, a variable pressure extraction can be carried out as described in Netherlands patent application No. 75,11124 and corresponding U.S. application Ser. No. 722,396.

The flow of solvent with extracted oil produced in the extraction vessel 6 is discharged through a pipe 7; the flow of solvent with solid particles is discharged via the discharge pipe 8 and arrives in a solvent remover 9 which construction equals that of the shaker conditioning device.

A mixture of water and hexane vapour flows from the solvent remover 9 to a condenser 16 through a vapour discharge duct 15. From condenser 16 water is discharged through a water discharge pipe 17 while hexane is recovered and supplied to the extraction device 6 through a pipe 18 and inlet 14. The mixture of water and hexane condensed in the vessel 16 is separated in a decanting vessel 19, which is connected at its bottom part with a water discharge pipe 17 and at its top with a hexane discharge pipe 18.

Extracted meal from the solvent remover 9 is, through a pipe 10, supplied to a dryer 11 in which drying to the desired humidity takes place. The extracted meal is finally discharged through a discharge pipe 20.

The flow of solvent with extracted oil supplied through the pipe 7 is fed to a separator 21 from which hexane vapours are discharged to a hexane vapour condenser 22, through a discharge pipe 23. This pipe 23 connects the condenser 22 with a vaporiser 21.

Finally, the residual oil and solvent are separated in the stripper 24.

The present invention presents several advantages with respect to the prior art machines:

(a) with the energy formerly consumed according to the known method by smooth rolling only for reducing the size of the seed, already a part of the oil is recovered from the raw material, which material can thereupon be easily extracted;

(b) owing to the use of a rotary press, the vegetable material supplied to the extractor 6 contains less oil, so that the extractor 6 will be smaller, from which follows that the total flow of solvent with extracted oil is relatively much smaller. This implies less consumption of solvent, less consumption of energy for pumps and subsequently a smaller apparatus for recovering the solvent, which also reduces the consumption of energy;

(c) owing to the use of lower temperatures and by shorter residence times of the material to be treated in the respective parts of the present apparatus, the quality of the extracted meal is much improved, whereas the quality of the produced oil is excellent, as the percentage of pressed oil in the rotary press 5 ranges now from 30–50%;

(d) any capital to be invested in the present apparatus is moderate as special rollers for rolling the pretreated vegetable material into fine flakes can be omitted, while the extractor device and, consequently, the device for recovery of extractant are much smaller;

(e) due to the fact that the rollers for rolling the raw material into flakes, deemed necessary according to the known method, are omitted, the upkeep cost can be considerably reduced because the rotary press and a shaker conditioner require little upkeep.

The use of a so-called variable pressure extractor for extracting oil components from oil containing vegetable material is rather effective.

It has been found that soja with an oil content of 18% still contains after treatment in a rotary press 11% oil. When a variable pressure extractor is used, an extracted meal with an oil precentage of only 0.4% can be obtained from the cake. Soja treated with the known direct extraction by means of a solvent yields an extracted meal with about 1.5% of residual oil.

A treatment with a variable pressure extractor also allows subjecting seeds with a high oil content to an extraction.

Extracted meal obtained according to the process in conformity with the invention contains proteins which are better soluble in water than the proteins in meal extracted in the known manner.

In the process according to the invention, it is of particular importance that also coarsely crushed seeds can be almost entirely freed from oils or fat which means a considerable economy, particularly when seeds containing little oil are extracted.

What I claim is:

1. Process for extracting oils or fats from vegetable material containing the same without flaking the material which comprises first coarsely crushing the material; then conditioning the coarsely crushed material by subjecting it to heat in the presence of moisture; then pressing the conditioned coarsely crushed material in a rotary press whose pressing area has a cross-section which decreases in the direction of the outlet; then extracting the pressed, conditioned, coarsely crushed material by contact with a solvent for the oil or fat; and then recovering the oil or fat.

2. Process according to claim 1 wherein the vegetable material is in the form of seeds, the coarsely crushing is effected by means of grooved rollers to achieve a size of 1–2 mm, the coarsely crushed seed is conditionedwhile the seed particles are separated at regular intervals, and wherein the solvent is separated from the extracted seeds by separating the seed particles at regular intervals while evaporating the solvent by means of steam.

3. Process according to claim 1, wherein the coarsely crushing is effected by means of grooved rollers.

4. Process according to claim 1, wherein the coarsely crushed material is conditioned, while the material particles are separated at regular intervals.

5. Process according to claim 1, wherein the solvent is separated from the extracted product by separating the particles at regular intervals while evaporating the solvent.

6. Process according to claim 1, wherein the separation of the solvent and the extracted product is effected by means of steam.

7. Process according to claim 1, wherein the extraction is effected in a variable pressure extractor.

* * * * *